United States Patent [19]

Möckli

[11] Patent Number: 4,744,179

[45] Date of Patent: May 17, 1988

[54] PROCESS FOR CONTROLLING TOOL INFEED AT MACHINING START OF A GEAR CUTTING MACHINE

[75] Inventor: Peter Möckli, Schaffhausen, Switzerland

[73] Assignee: Reishauer AG, Zurich, Switzerland

[21] Appl. No.: 875,840

[22] Filed: Jun. 18, 1986

[30] Foreign Application Priority Data

Jul. 1, 1985 [CH] Switzerland ............................ 2808/85

[51] Int. Cl.[4] ................................................ B24B 1/00
[52] U.S. Cl. .................................. 51/287; 51/95 GH; 409/12
[58] Field of Search ................... 409/66, 1, 11, 12, 18, 409/19, 20, 22, 23; 51/95 GH, 287

[56] References Cited

U.S. PATENT DOCUMENTS

| | | | |
|---|---|---|---|
| 2,385,650 | 9/1945 | Rickenmann | 51/71 |
| 4,195,446 | 4/1980 | Angst | 51/105 |
| 4,475,319 | 10/1984 | Wirz | 409/66 X |

FOREIGN PATENT DOCUMENTS 585609  4/1975  Switzerland .

*Primary Examiner*—Z. R. Bilinsky
*Attorney, Agent, or Firm*—Sughrue, Mion, Zinn, Macpeak & Seas

[57] ABSTRACT

A process for controlling the tool infeed prior to machining a semi-machined gear comprises aligning the tool with the gear and feeding the tool radially inwardly in rapid traverse without making contact with the gear. The continuous rotating tool is then fed in incrementally in intervals of at least one gear revolution until the tool touches the gear for the first time. At this time the machining process is started.

9 Claims, 1 Drawing Sheet

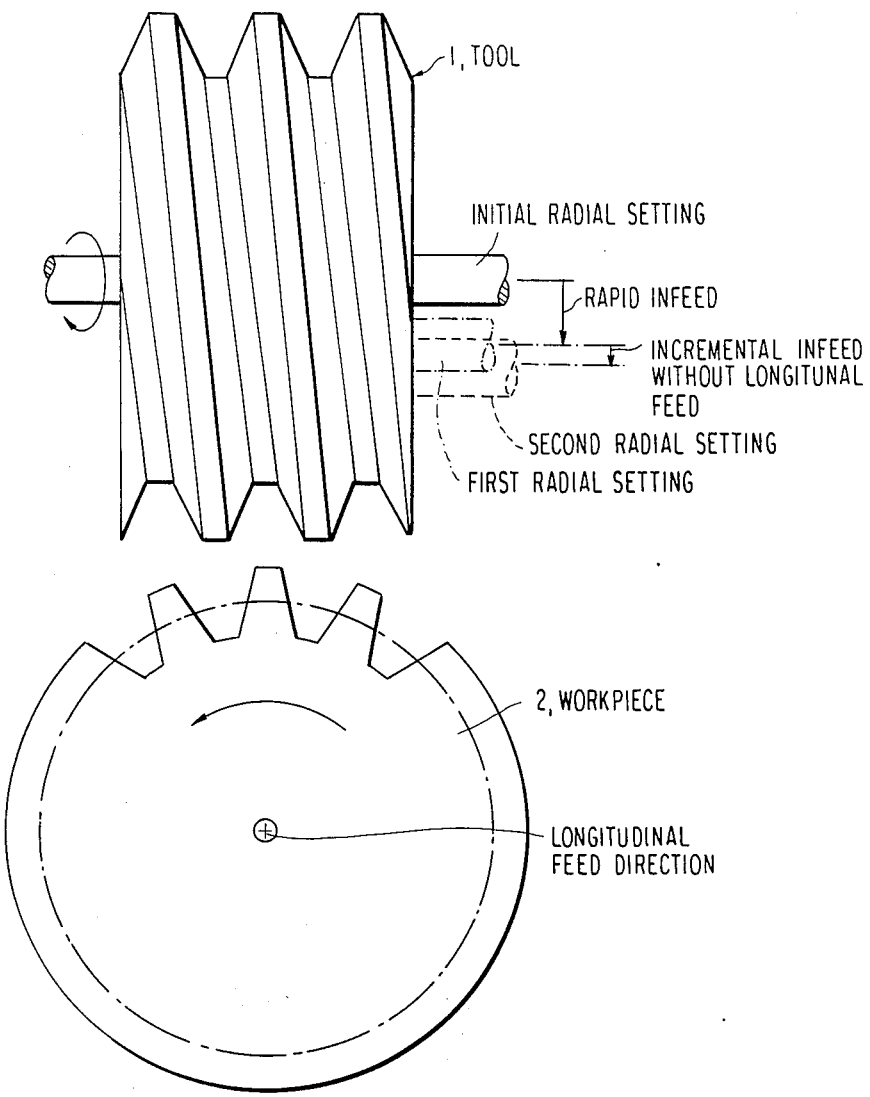

PROCESS FOR CONTROLLING TOOL INFEED AT MACHINING START OF A GEAR CUTTING MACHINE

BACKGROUND OF THE INVENTION

The present invention is directed to a process for controlling the infeed of a tool at the start of operation of a machine tool which operates in a continuous gear shaping process.

U.S. Pat. No. 4,195,446 discloses a gear cutting machine which operates in a continuous gear shaping process. In this machine a gear processing grinder is controlled by positive movement and operated according to the screw rolling process in which a rotating tool is controlled in its movement prior to engagement with the preprocessed toothing of a workpiece gear rotating at a predetermined rate in relation to the tool. The improvement is characterized by a sensor which may be moved between the tool and the workpiece during the running of the tool or workpiece prior to the engagement of the tool and the workpiece. U.S. Pat. No. 4,195,446 deals primarily with the alignment of the rotating tool with respect to the workpiece that is also automatically rotating at working speed. After alignment, the tool is fed in radially until it engages with the workpiece. This movement should occur as rapidly as possible in order to keep the cycle time short. In this process it is difficult to estimate the amount of movement allowable for this initial rapid infeed.

A process and an apparatus for controlling the rapid infeed of the grinding wheel of a round and flat grinding machine is disclosed in Swiss Pat. No. 585,609. This apparatus is equipped with a microphone which is responsive to ultrasonic beams. The microphone transmits the vibrations, which occur when the grinding wheel encounters the work piece, in the form of a signal to the control, which stops the rapid infeed of the grinding wheel, and switches said grinding wheel to a continuous working feed or to an incremental infeed. The use of this apparatus for gear cutting in a continuous gear shaping machine is associated with a great disadvantage since it does not consider the error given for running true that occurs when semi-machining the tooth space. If during infeed of the gear shaping tool (grinding worm, hobbing cutter, milling worm, etc.), the latter were by accident to encounter the workpiece (gear, etc.) in the lowest point of the gear's non-circularity, the layer of material to be lifted off would increase greatly in the next half of the workpiece's revolution, corresponding to the size of the deviation from the true run of the gear and eventually exceed the permissible size. This could result in frictional heat and damage to the tool.

BRIEF DESCRIPTION OF THE DRAWING

The FIGURE illustrates a conventional gear shaping tool in alignment with a workpiece to be machined.

DESCRIPTION OF THE INVENTION

The present invention provides a new and improved process for controlling the tool infeed at the beginning of a continuous gear shaping process such that the tool infeed time can be minimized, the execution of so-called air strokes can be reduced to a minimum and that the frictional heat and damage to the tool can be avoided with certainty.

The invention concerns a process for controlling a tool infeed prior to the start of machining a workpiece on a gear cutting machine which operates in a continuous gear shaping process comprising the steps of:

(a) aligning the tool and workpiece prior to the infeed of the tool into semi-machined teeth of the workpiece wherein the rotation of the tool is automatically coupled to the rotation of the workpiece;

(b) feeding the tool radially in rapid traverse into tooth spaces of the workpiece without any contact being made to a first setting;

(c) incrementally feeding the tool in intervals of at least one revolution of the workpiece and in amounts of one feed step at a time until a second setting of the tool is reached wherein the tool makes contact with the workpiece for the first time and that thereupon the machining process commences;

(d) moving the rotating tool in a longitudinally back and forth stroke over the width of the workpiece; and (e) feeding the tool radially by one feed step at least at one end of the longitudinal stroke.

The rapid infeed is carried out differently than in the process according to Swiss Pat. No. 585,609. where a period of time, even if it is short, elapses automatically from the moment the contact signal arrives until the feed carriage stands still during which time the infeed still continues.

The FIGURE illustrates a conventional gear shaping tool 1 which is part of a gear cutting machine (not illustrated). A semi-machined workpiece 2 is shown in alignment with the tool 1 which is in the initial radial setting prior to the commencement of the machining process.

The successive incremental infeed can occur significantly faster than in the machining process since a feed step can occur after every revolution of the workpiece. Thus the execution of air strokes is at a minimum. Since the feed steps are constrained in amount to those steps of the machining process, e.g., to the size of one roughing feed step, it is possible to avoid frictional heat and damage to the tool with certainty.

The execution of air strokes can be totally avoided by switching off the longitudinal feed during rapid infeed and the subsequent incremental infeed. In this respect it is especially expedient if during the rapid infeed and the incremental infeed between the first and second settings, the tool is in the middle of the width of the rim of the gear of the workpiece so that negligible tolerances of the angle of the axis are averaged.

In order to start the machining process after reading the second setting the longitudinal feed is carried out to one end of the stroke and back without a feed step. In this manner the removal of a larger amount of material than the amount of one feed step at any one point of the tool is avoided. Alternatively the tool may be pulled back a feed step, moved to one end of the longitudinal feed stroke and then fed inwardly by one feed step.

It is possible to determine optically the first time the tool makes contact with the workpiece. It is however also possible to use for this purpose an acoustical apparatus such as that in Swiss Pat. No. 585,609. In this manner the infeed of the tool can run totally automatically.

The process in accordance with the invention is especially suitable for gear grinding machines; however, it is also applicable to hobbing machines.

Furthermore, a second process is provided similar to that described in U.S. Pat. No. 2,385,650. In the process of Swiss Pat. No. 246,320 the tool and the workpiece are first manually aligned with one another while at rest and the tool is fed radially in the first radial setting to engage with the workpiece. Then the workpiece is uncoupled from its drive and the tool drive is switched on so that the workpiece is driven by the tool. Not until the drive of the tool is accelerated is the workpiece coupled with its synchronously rotating drive and the machining process is started. Thus the tool and the workpiece can be accelerated precisely in step with one another without the necessity of expensive systems for the drive in order to achieve this synchronization.

As in the case of the first mentioned process it is difficult to select the optimum amount of the initial radial infeed in the first radial setting. If the amount selected is too small the machine tool will execute many "air strokes" before both flanks of a tooth mesh. In addition to this, initially the teeth of the tool are not in the middle of the tooth spaces of the workpiece so that a lot of material is removed unnecessarily at one of the flanks of a tooth. During this process the machining time is long and thus for this reason the machining is uneconomical. If on the other hand the radial infeed in the first radial setting were selected so large that both flanks of the tooth of the work tool would touch the workpiece, it could happen that this occurs by accident in the lowest point of non-circularity of the semi-machined gear of the workpiece. Then the layer of material to be lifted off could increase in the next half of the revolution and eventually exceed the permissible size, which, following the start of longitudinal feed, could result in friction heat and damage to the tool.

Thus the problem of optimizing the tool infeed such that air strokes are reduced to a minimum and frictional heat and damage to the tool are avoided with certainty is analogous to the aforementioned problem. This problem is solved analogous to the aforementioned problem by initially interrupting the drive connection to the workpiece, feeding the tool radially inwardly to the first setting, starting the rotary drive of the tool so that the workpiece is driven by the tool, feeding the tool radially inwardly incrementally in intervals of at least one workpiece revolution and in the amount of one feed step from said first setting to a second radial setting wherein the tool touches the workpiece for the first time on both sides and then connecting the workpiece to the drive therefore to start the machining process.

Here too the initial radial infeed occurs only in so far as it is certain that no two flanks have made contact yet. Once again for this original radial infeed, the production tolerances of the semi-machined work tool are taken into special consideration. After the drive of the tool has been switched on the incremental infeed can occur significantly faster than in the machining process since after every revolution of the workpiece, a feed step can occur. Thus the execution of air strokes is at a minimum. Since the feed steps are constrained in size to those steps of the machining process, e.g., to the size of the roughing feed step, frictional heat and damage to the tool can be avoided with certainty.

By having the radial feed steps occur approximately in the middle of the width of the rim of the gear workpiece tolerances given for the angle of the axis can be averaged. Having the workpiece being lightly connected to the drive initially has the advantage that, first of all, the crudest irregularities can be filed off and thus the relative setting of the angle of the workpiece, relative to the tool, is averaged to a certain degree. In this manner the surplus material on the workpiece can be kept low and thus the machining time can be minimized. In order to prevent the removal of larger amounts of material than the amount of one feed step at any one point of the tool, the longitudinal feed movements as described above with respect to the first embodiment are once again suitable.

While the invention has been particularly shown and described with reference to preferred embodiments thereof it will be understood by those in the art that the foregoing and other changes in form and details may be made therein without departing from the spirit and scope of the invention.

What is claimed is:

1. Process for controlling a tool infeed prior to the start of machining a workpiece on a gear cutting machine which operates in a continuous gear shaping process comprising the steps of:
    (a) aligning the tool and workpiece prior to the infeed of the tool into semi-machined teeth of the workpiece wherein the rotation of the tool is automatically coupled to the rotation of the workpiece;
    (b) feeding the tool radially in rapid traverse into tooth spaces of the workpiece without any contact being made to a first setting;
    (c) incrementally feeding the tool in intervals of at least one revolution of the workpiece and in amounts of one feed tep at a time until a second setting of the tool is reached wherein the tool makes contact with the workpiece for the first time and that thereupon the machining process commences;
    (d) moving the rotating tool in a longitudinally back and forth stroke over the width of the workpiece; and
    (e) feeding the tool radially by one feed step at least at one end of the longitudinal stroke.

2. Process as claimed in claim 1 further comprising the steps of:
    switching the longitudinal stroke off during rapid feeding and incremental feeding between the first and second settings; and
    switching the longitudinal stroke after the second setting has been reached in order to start the machining process.

3. Process as claimed in claim 2 further comprising the step of aligning the tool with the middle of the width of the workpiece during rapid feeding and incremental feeding between the first and second settings.

4. Process as claimed in claim 1 further comprising the step of executing the longitudinal stroke from one end of the stroke to the other end of the stroke upon reaching the second radial setting without a feed step.

5. Process a claimed in claim 1 further comprising the steps of:
    withdrawing the tool by one feed step upon reaching the second radial setting; and
    moving to one end of the longitudinal stroke and feeding the tool by one feed step to start the machining process.

6. A process for controlling a tool infeed prior to the commencement of machining a workpiece in a gear cutting machine comprising the steps of:
    (a) aligning the tool and the workpiece with one another prior to the infeed of the tool into semi-machined teeth of the machine;

(b) feeding the tool radially into a first radial setting wherein there is still free play between the tool and the teeth of the workpiece;
(c) disconnecting the workpiece drive from the tool drive;
(d) initiating the rotary drive of the tool so that the workpiece is driven by the tool;
(e) incrementally feeding the tool in intervals of at least one workpiece rotation each and in an amount of one feed step from the first radial setting to a second radial setting wherein no play exists between the tool and the teeth of the workpiece;
(f) connecting the tool drive to the workpiece drive so that the tool and the workpiece rotate synchronously and the machining process commences;
(g) moving the rotating tool in a longitudinally back and forth stroke over the width of the workpiece; and
(h) feeding the tool radially by one feed step at least at one end of the longitudinal stroke.

7. Process as claimed in claim 6 further comprising the steps of:
switching the longitudinal stroke off during the radial feed steps; and
aligning the tool with the middle of the width of the workpiece during the radial feed steps.

8. Process as claimed in claim 6 further comprising the step of executing the longitudinal stroke from one end of the stroke to the other end of the stroke upon reaching the second radial setting without a feed step.

9. Process as claimed in claim 6 further comprising the steps of:
withdrawing the tool by one feed step upon reaching the second radial setting; and
moving to one end of the longitudinal stroke and feeding the tool by one feed step to start the machining process.

* * * * *